(12) United States Patent
Schwarz (10) Patent No.: US 11,780,611 B2
(45) Date of Patent: Oct. 10, 2023

(54) SPACECRAFT WITH UNIVERSAL EXTERNAL PORT

(71) Applicant: MAXAR SPACE LLC, Palo Alto, CA (US)

(72) Inventor: Robert Erik Schwarz, Los Gatos, CA (US)

(73) Assignee: Maxar Space LLC, Palo Alto, CA (US)

( * ) Notice: Subject to any disclaimer, the term of this patent is extended or adjusted under 35 U.S.C. 154(b) by 494 days.

(21) Appl. No.: 17/022,550

(22) Filed: Sep. 16, 2020

(65) Prior Publication Data

US 2022/0081131 A1  Mar. 17, 2022

(51) Int. Cl.
| | |
|---|---|
| *B64G 1/10* | (2006.01) |
| *H04W 4/50* | (2018.01) |
| *H04L 12/40* | (2006.01) |
| *B64G 1/42* | (2006.01) |
| *B64G 1/40* | (2006.01) |

(Continued)

(52) U.S. Cl.
CPC .............. *B64G 1/10* (2013.01); *B64G 1/40* (2013.01); *B64G 1/428* (2013.01); *G05D 1/101* (2013.01); *G06F 8/65* (2013.01); *H04L 12/40045* (2013.01); *H04W 4/50* (2018.02); *B64G 2001/1092* (2013.01)

(58) Field of Classification Search
CPC . B64G 1/10; B64G 1/40; B64G 1/428; B64G 2001/1092; B64G 1/1007; B64G 1/242; B64G 1/66; G05D 1/101; G06F 8/65; H04L 12/40045; H04W 4/50
See application file for complete search history.

(56) References Cited

U.S. PATENT DOCUMENTS

| | | | | |
|---|---|---|---|---|
| 6,298,289 B1 * | 10/2001 | Lloyd | .................... | B64G 1/283 701/13 |
| 8,550,408 B2 * | 10/2013 | Ross | ...................... | B64G 1/641 244/159.4 |
| 10,773,835 B2 * | 9/2020 | Cosner | .................. | B64G 1/641 |

(Continued)

FOREIGN PATENT DOCUMENTS

GB         2548109 A  *  9/2017  ............... B64G 1/22

OTHER PUBLICATIONS

Leete, "Design for On-Orbit Spacecraft Servicing," Oct. 2001, NASA Goddard Space Flight Center.

*Primary Examiner* — Valentina Xavier
(74) *Attorney, Agent, or Firm* — Vierra Magen Marcus LLP (57) ABSTRACT

A universal external port is proposed to add new functionality to or replace existing functionality of an already deployed spacecraft (e.g., a satellite in orbit). The universal external port is mounted on an external surface of the spacecraft and configured to connect to different types of external modules that have different functions, without removing components from the spacecraft other than one or more components of the universal external port. A communication interface onboard the spacecraft is configured to wirelessly receive a software patch from an entity remote from the spacecraft (e.g., from a ground terminal or other spacecraft) to program the spacecraft to change operation of the spacecraft to utilize the external module when the external module is connected to the universal external port.

20 Claims, 5 Drawing Sheets

(51) Int. Cl.
*G05D 1/10* (2006.01)
*G06F 8/65* (2018.01)

(56) References Cited

U.S. PATENT DOCUMENTS

| | | | |
|---|---|---|---|
| 11,673,695 B2 * | 6/2023 | Kline | B64G 1/428 |
| | | | 244/172.6 |
| 2018/0093786 A1 | 4/2018 | Schwarz | |
| 2020/0017243 A1 * | 1/2020 | Holemans | B64G 1/10 |
| 2022/0127023 A1 * | 4/2022 | Norwood | B64G 1/1007 |
| 2022/0242594 A1 * | 8/2022 | Ekblaw | G01R 33/0385 |

* cited by examiner

SPACECRAFT WITH UNIVERSAL EXTERNAL PORT

BACKGROUND

The number of space activities and the number of entities performing space activities has been increasing. For purposes of this document, space activities are functions performed completely or partially in space. The term "space" refers to being beyond the Earth's atmosphere, in orbit around the Earth, or at a distance from the Earth's surface that is equivalent to (or greater than) a distance of an object in orbit around the Earth. Examples of space activities include communication, transport, solar system exploration and scientific research. For example, the International Space Station is an orbiting research facility that functions to perform world-class science and research that only a microgravity environment can provide. Other activities performed in space can also be considered space activities.

Many services are provided by spacecraft. For example, satellites in geosynchronous orbit are used to provide communications (e.g., Internet Access, television broadcasts, telephone connectivity) and data gathering services (e.g., weather data, air traffic control data, etc.). Because longitudes ("slots") at which spacecraft may be stationed in geosynchronous orbit are limited, there is a strong market demand to maximize the revenue generated from each slot. As a result, satellites disposed in geosynchronous orbit have become larger, more complex and expensive, with satellite operators demanding higher power, more payload throughput, and multi-payload spacecraft. The cost to build and deploy such satellites has become increasingly expensive.

Due to the high costs, modern spacecraft are typically required to reliably operate in orbit for 15 years or more, which is referred to as the projected operational life of the spacecraft. However, changes in payload technology and market demands may result in obsolescence of a payload well before the spacecraft reaches the end of its projected operational life. Also, sometimes components of a spacecraft malfunction or are damaged. If, for any of the reasons discussed above, an owner/operator of a spacecraft is not able to utilize the spacecraft for the full projected operational life of the spacecraft, then the owner/operator will not recoup the large investment made to design, build and deploy the spacecraft. In some cases, a spacecraft may be removed from service due to failures in critical systems that may account for a very small fraction of the system cost, but nonetheless the failure of which will render the system inoperable.

DETAILED DESCRIPTION

A universal external port is proposed to add new functionality to or replace existing functionality of an already deployed spacecraft (e.g., a satellite in space). The universal external port is mounted on an external surface of the spacecraft and configured to connect to different types of external modules that have different functions, without removing components from the spacecraft other than one or more components of the universal external port. A communication interface onboard the spacecraft is configured to wirelessly receive a software patch from an entity remote from the spacecraft (e.g., from a ground terminal or other spacecraft) to program the spacecraft to change operation of the spacecraft to utilize the external module when the external module is connected to the universal external port.

The proposed universal external port can extend the use of a spacecraft for the full projected operational life of the spacecraft. For example, if an existing component of a spacecraft malfunctions or is damaged, the functionality of that existing component can be replaced by a new component (i.e. the external module) that is connected to the universal external port while the spacecraft is deployed (e.g., in orbit or otherwise in space). Additionally, a new component (i.e. the external module) can be connected to the universal external port while the spacecraft is deployed in order to add new functionality to the spacecraft so that the spacecraft can remain useful for a longer period of time. The universal external port allows a new component to be added to the spacecraft without removing components from the spacecraft (other than one or more components of the universal external port). By not requiring the removal of existing components, it is easier to service the spacecraft in space, as no new debris is created.

By using a universal external port that is configured to connect to different types of external modules that have different functions, fewer external ports need to be included on spacecraft. If the external port was specific for a particular module, then the spacecraft would need additional ports for each type of module and some additional functionality may not be able to be added because the external port was engineered for specific preconceived functions.

It is planned that service satellites (or other spacecraft) will be used to service damaged or obsolete spacecraft already deployed. The universal external port will allow such service satellites to be effective with a greater number of satellites having a greater number of issues. The universal external port will increase the probability of a service satellite being able to service a spacecraft and should reduce the costs of such servicing due to the modular nature and decrease in complexity of the universal external port.

One embodiment includes a spacecraft that comprises a processor onboard the spacecraft, a universal external port positioned on an external surface of the spacecraft and connected to the processor, and a communication interface onboard the spacecraft and connected to the processor. The universal external port is configured to connect to different types of external modules that have different functions. The universal external port comprises a mechanical interface configured to physically connect an external module to the universal external port and an electrical interface configured to provide electrical communication between the processor and the external module via the universal external port when the external module is connected to the universal external port. The communication interface is configured to wirelessly receive software from an entity remote from the spacecraft to program the processor to change operation of the spacecraft to utilize the external module when the external module is connected to the universal external port.

Figure 1:
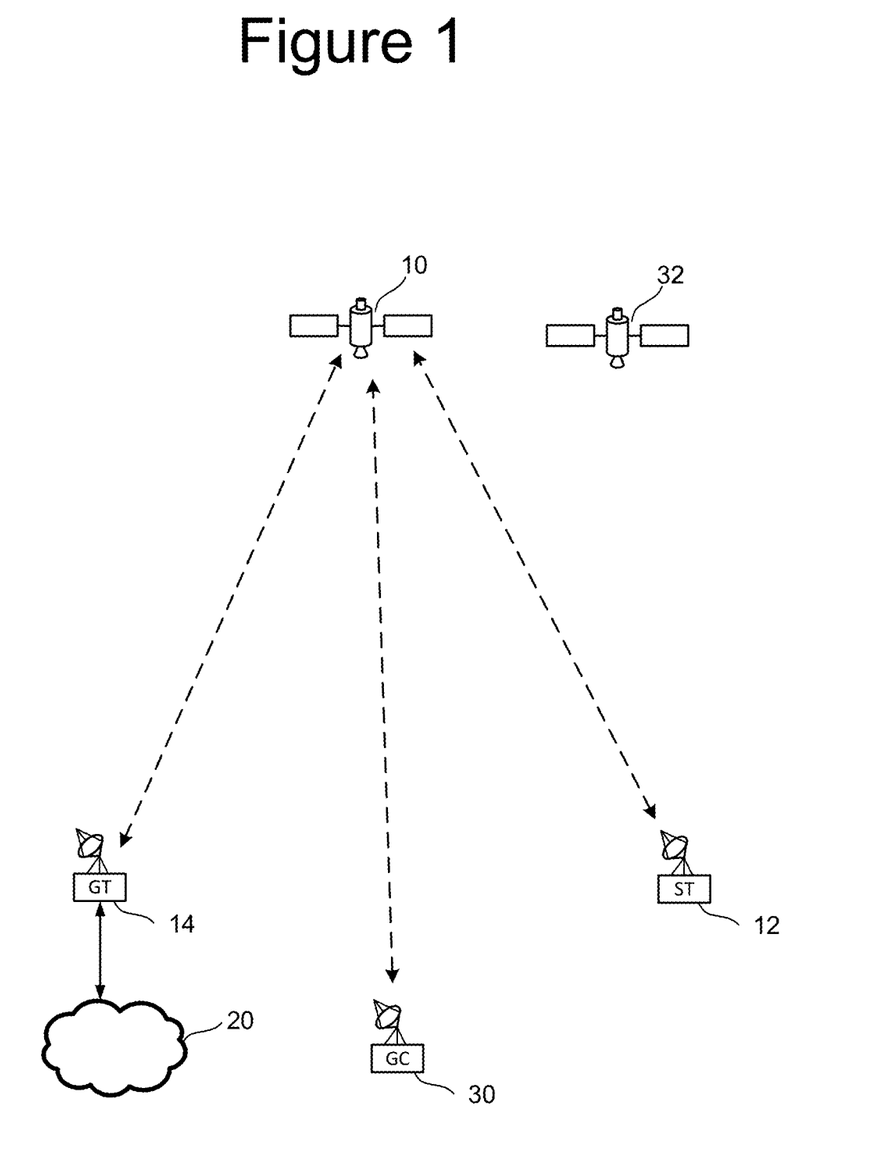
FIG. 1 is a block diagram of a spacecraft system.

FIG. 1 is a block diagram of a spacecraft system that can implement the technology proposed herein. The system of FIG. 1 includes spacecraft 10, subscriber terminal 12, gateway 14, ground control terminal 30 and servicing spacecraft 32. Subscriber terminal 12, gateway 14, and ground control terminal 30 are examples of ground terminals. In one embodiment, spacecraft 10 is a satellite; however, spacecraft 10 can be other types of spacecrafts (e.g., shuttle, space station, inter-planet traveling craft, rocket, etc.). Spacecraft 10 may be located, for example, at a geostationary or non-geostationary orbital location. Spacecraft 10 can also be a Low Earth Orbit satellite. Spacecraft 10 is communicatively coupled by at least one wireless feeder link to at least one gateway terminal 12 and by at least one wireless user link to a plurality of subscriber terminals (e.g., subscriber terminal 12) via an antenna system. Gateway terminal 14 is connected to the Internet 20. The system allows satellite 10 to provide internet connectivity to a plurality of subscriber terminals (e.g., subscriber terminal 12) via gateway 14. Ground control terminal 30 is used to monitor and control operations of spacecraft 10.

Servicing spacecraft 32 can be a satellite, rocket, space shuttle, space station or other type of spacecraft that is capable to navigating to and docking with spacecraft 10. If equipment on spacecraft 10 malfunctions or it is desired to add new equipment to spacecraft 10, servicing spacecraft 32 is used to deliver new equipment (i.e. the external module) to spacecraft 10 so that the new equipment can be connected to the universal external port of spacecraft 10. More details are provided below. Note that the system of FIG. 1 is only one example of a system that can use the technology described herein.

Figure 2:
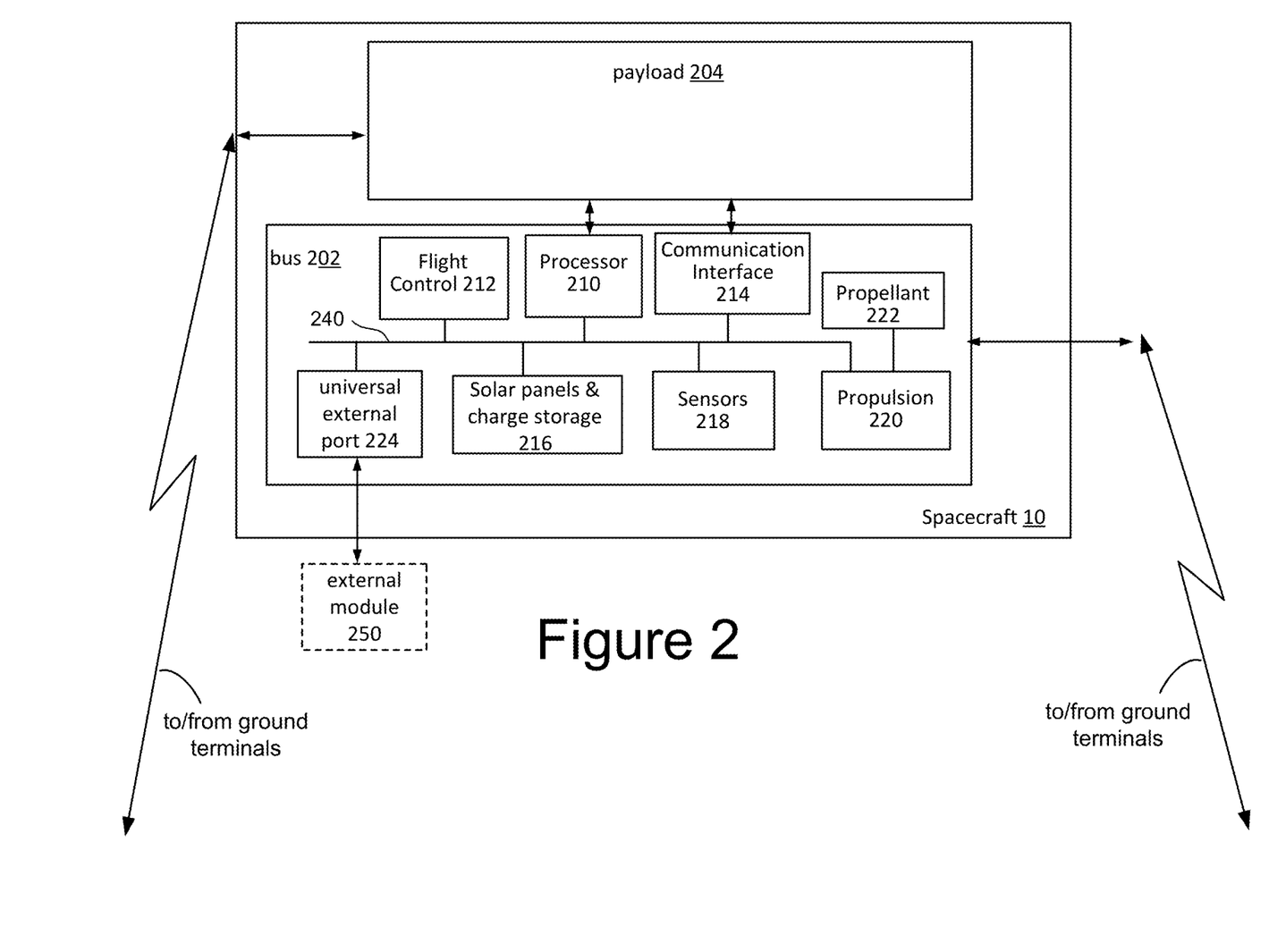
FIG. 2 is a block diagram of an example spacecraft.

FIG. 2 is a block diagram of one embodiment of spacecraft 10, which in one example (as discussed above) is a satellite. In one embodiment, spacecraft 10 includes a bus 202 and a payload 204 carried by bus 202. Some embodiments of spacecraft 10 may include more than one payload. The payload provides the functionality of communication, sensors and/or processing systems needed for the mission of spacecraft 10.

In general, bus 202 is the spacecraft that houses and carries the payload. For example, the bus includes processor 210, flight control module 212, communication interface 214, solar panels and charge storage (e.g., one or more batteries) 216, sensors 218, a propulsion system 220 (e.g., thrusters), propellant 222 to fuel some embodiments of propulsion system 220, and universal external port 224, all of which are connected by communication network 240 (which can be an electrical bus or other means for electronic, optical or RF communication). Other equipment can also be included. In some embodiments, universal external port 224 is positioned on payload 204 rather than on bus 202. In some embodiments, both payload 204 and bus 202 include separate universal external ports. Flight control module 212 includes command control functions for spacecraft 10, attitude control functionality and orbit control functionality. Communication interface 214 includes wireless communication and processing equipment for receiving telemetry data/commands, other commands from the ground control terminal 30 to the spacecraft and ranging to operate the spacecraft. Processor 210 is used to control and operate spacecraft 10. An operator on the ground can control spacecraft 10 by sending commands via ground control terminal 30 to communication interface 214 to be executed by processor 210. In one embodiment, processor 210 and communication interface 214 are in communication with payload 204. In some example implementations, bus 202 includes one or more antennas connected to communication interface 214 for wirelessly communicating between ground control terminal 30 and communication interface 214. Solar panels and charge storage 216 are used to provide power to spacecraft 10. Propulsion 220 is used for changing the position or orientation of spacecraft 10 while in space to move into orbit, to change orbit or to move to a different location in space. Sensors 218 are used to determine the position and orientation of spacecraft 10. The sensors can also be used to gather other types of data (e.g., weather, location of other objects, etc.). One or more sensors can also be included in payload 204.

Bus 202 includes universal external port 224, which is an interface mounted on an external surface of spacecraft 10, connected to communication network 240 (and, thereby connected to the other components 210-220 of bus 202), and configured to connect to different types of external modules that have different functions. An external module (e.g., an expansion or replacement module) 250, that is initially not part of and separate from spacecraft 10, can be connected to universal external port 224 so that the external module 250 can communicate with any of processor 210, flight control module 212, communication interface 214, solar panels and charge storage 216, sensors 218, and propulsion system 220 via communication network 240 in order to add new functionality to spacecraft 10 or to replace the functionality of any of processor 210, flight control module 212, communication interface 214, solar panels and charge storage 216, sensors 218, and propulsion system 220 without removing any of processor 210, flight control module 212, communication interface 214, solar panels and charge storage 216, sensors 218, and propulsion system 220.

External module 250 is depicted in FIG. 2 with dashed lines to indicate that is not initially part of spacecraft 10. Rather, eternal module 250 is a separate component that is connected to universal external port 224 after spacecraft 10 is deployed in space. External module 250 can include any functionality including (but not limited to) a processor, flight control system, communication system, solar panels, batteries, sensors, propulsion systems, antennas systems, weather sensing, cameras, telescopes, heat shields, scientific experiments, gyro, inclinometer, etc.

In one embodiment, the payload 104 includes an antenna system (not depicted) that provides a set of one or more beams (e.g., spot beams) comprising a beam pattern used to receive wireless signals from ground stations and/or other spacecraft, and to send wireless signals to ground stations and/or other spacecraft. In some implementations, communication interface 214 uses the antennas of payload 104 to wirelessly communicate with ground control terminal 30.

Figure 3A:
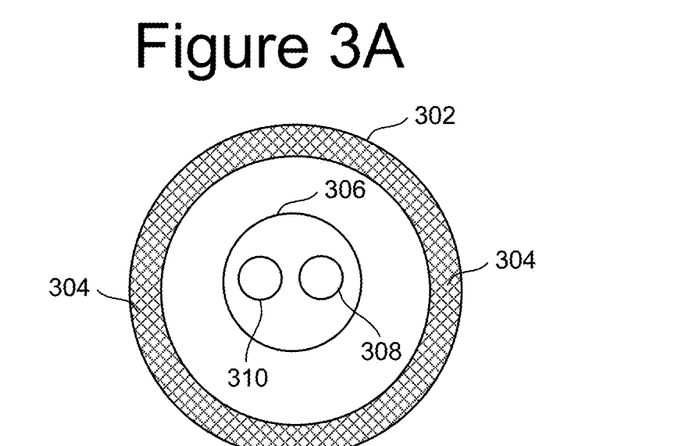
FIG. 3A is a block diagram of one embodiment of a universal external port.

FIG. 3A is a block diagram of one embodiment of universal external port 302, which is one example implementation of universal external port 224 of FIG. 2. Universal external port 302 comprises a mechanical interface 304 configured to lock an external module 250 to the universal external port when spacecraft 10 is deployed (e.g., in orbit, in space or in other location performing its mission) and a switched electrical interface 306 configured to provide electrical communication between processor 210 (and/or other components of bus 202) and the external module 250 via universal external port 302 when external module 250 is locked to universal external port 302. Note that universal external port 302 is configured to connect to external module 250 such that the external module 250 functionally replaces or augments one of the plurality of functional modules without removing the replaced functional module. Examples of functional modules can include any of the components of bus 202 or payload 204. Mechanical interface 304 can be any mechanical dock known in the art that can physically connect the external module 250 to universal external port 302 and lock the external module 250 to universal external port 302 under the direction of processor 210 (or another component). External module 250 will also have a mechanical interface for connecting to mechanical interface 304.

One embodiment of electrical interface 306 includes electrical signals 308 and power signals 310. Electrical signals 308 is a bidirectional (or single direction) connection to communication network 240 so that when external module 250 is connected to universal external port 302, external module 250 can communicate with processor 210 (or any of the other components of bus 202 or payload 204) in order to receive or send commands and data. In another embodiment, electrical signals 308 is a direct electrical connection to processor 210. In another embodiment, electrical signals 308 can include optical signals. Power signals 310 is a means for spacecraft 10 to provide power (e.g., from solar panels and charge storage 216) to external module 250. In another embodiment, power signals 310 is a means for external module 250 to provide power to spacecraft 10. For example, in one embodiment external module is a power supply or includes a power supply (e.g., a battery, solar panels, etc.).

In one embodiment, electrical interface 306 is switched in that processor 210 (or another component) can control whether electrical interface 306 is on or off. In this manner, electrical interface 306 can be turned off if no external module is connected to universal external port 302.

In one embodiment, the universal external port 302 of FIG. 3A would not include any means to allow, and thereby prevents, thermal transfer between external module 250 and spacecraft 10. In such an embodiment, external module 250 would need to include thermal control for itself.

In one embodiment, universal external port 302 is mounted or positioned on an external surface of the spacecraft. In one example, universal external port 302 is mounted or positioned on the anti-Earth deck of spacecraft 10. The anti-Earth deck is the face or external surface of bus 202 that faces away from Earth.

Figure 3B:
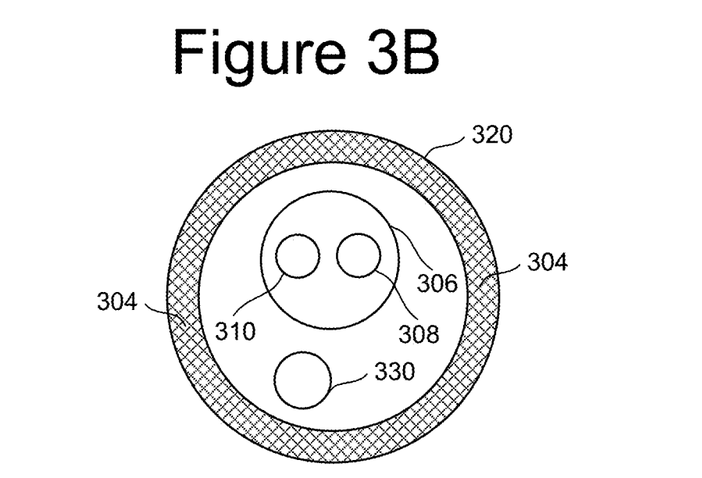
FIG. 3B is a block diagram of one embodiment of a universal external port.

FIG. 3B is a block diagram of universal external port 320, which is another example implementation of universal external port 224 of FIG. 2. Universal external port 320 comprises the same mechanical interface 304 and electrical interface 306 as universal external port 302. However, universal external port 320 includes thermal transfer connection 330 that allows spacecraft 10 to transfer heat to or from external module 250 in order to provide thermal control for external module 250. In another embodiment, external module 250 uses thermal transfer connection 330 to transfer heat to or from spacecraft 10 in order to provide thermal control for external module 250 and/or spacecraft 10.

As discussed above, the universal external port is configured to connect to different types of external modules that have different functions. In some cases, it is not known what functions an external module will provide when spacecraft 10 is designed, built and/or deployed. Therefore, spacecraft 10 may need to be adapted to utilize the external module. One means to adapt spacecraft 10 is to upload new software to spacecraft 10. For example, processor 210 can be any processor known in the art suitable for space applications and processor 210 may be programmed using software loaded into a persistent storage device (e.g., hard disk drive, solid state drive, flash memory, etc.) in processor 210. When a new external module is connected to the universal external port, a software patch is uploaded to spacecraft 120 and installed in the persistent storage device in order to program processor 210 to work with, communicate with and utilize the functions of the newly connected external module, without having to remove any components of the spacecraft (except, maybe one or more portions of the mechanical interface 304 and electrical interface 306 of universal external port). The software patch can replace all or a portion of existing software, or be added to the existing software. A software patch can also be uploaded for other components of bus 202 other than (or in addition to) processor 210. In one embodiment, the universal external port will include a local processor that is programmed with software and can receive a software patch to program the local processor to work with, communicate with and utilize the functions of the newly connected external module. In one embodiment, the software patch is wirelessly uploaded (e.g., RF or optical communication) from ground control terminal 30 to satellite 10 (e.g., via communication interface 214). The above-described software patch makes the universal external port a programmable port.

Figure 4:
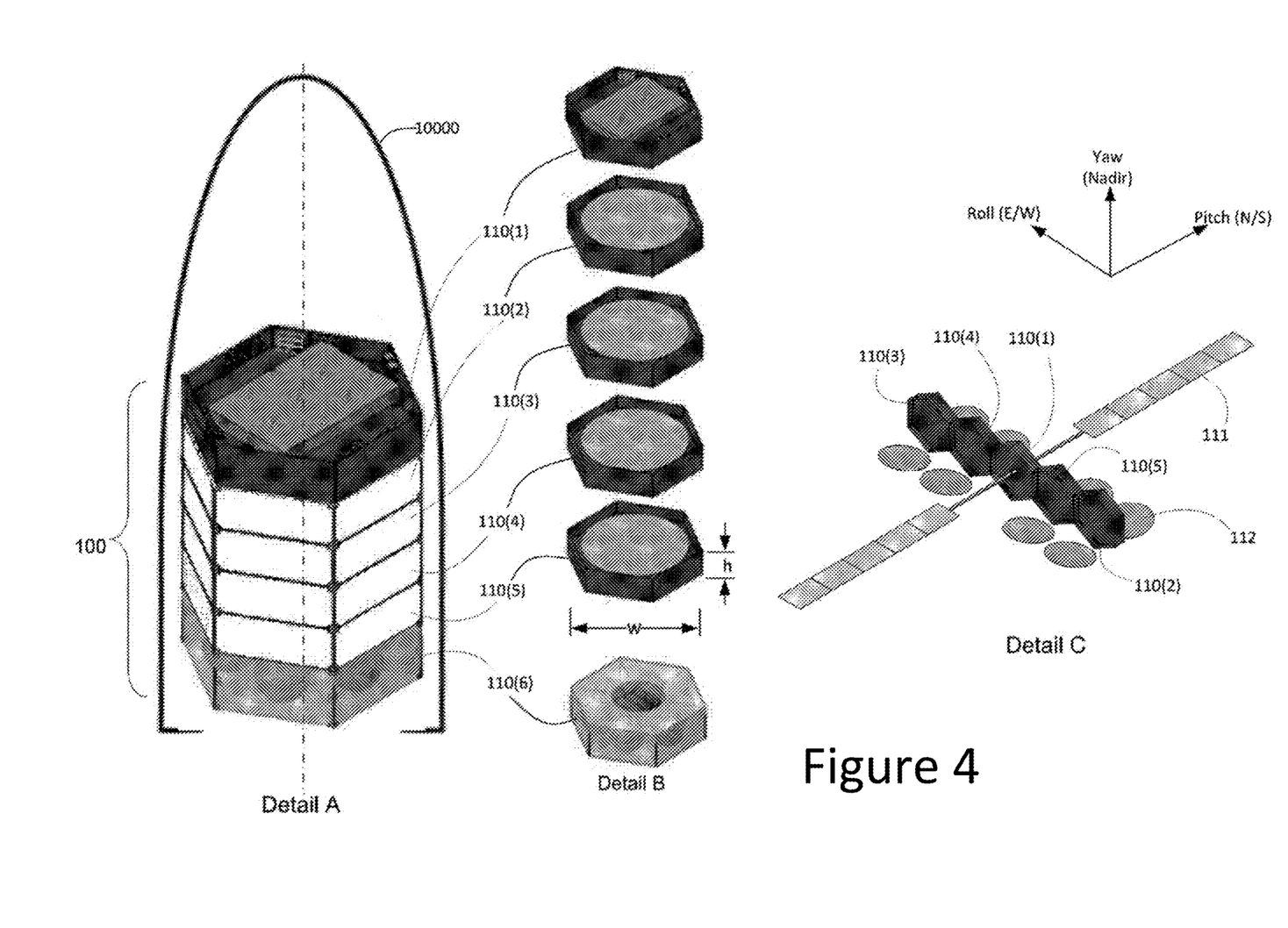
FIG. 4 illustrates an example of a spacecraft comprising a plurality of functional modules.

FIG. 4 illustrates an example of an alternative spacecraft configured as a self-assembling persistent modular space platform that can be used to implement the technology described herein pertaining to the universal external port. Referring to Detail A of FIG. 4, the spacecraft 100, illustrated in a launch configuration enclosed by a launch vehicle fairing, includes six deployable module elements 110. In the illustrated implementation, the deployable module element 110(1) may be configured as a bus service module, each of the deployable module elements 110(2), 110(3), 110(4) and 110(5) may be configured as a respective payload module, and the deployable module element 110(6) may be configured as a propulsion module. In one embodiment bus service module 110(1) includes the components of bus 202 (see FIG. 2). In one example, spacecraft 100 (FIG. 4) is an example embodiment of spacecraft 10 (FIGS. 1 and 2)

As may be better observed in Detail B of FIG. 4, the deployable modules may be configured to have a similar form factor where a height h is small relative to width w. For example, in the illustrated implementation, h may be approximately one meter and w may be selected to maximize utilization of the launch vehicle fairing diameter, which may be approximately 4-5 meters. In the illustrated implementation, the deployable module elements have six edge faces, but a greater or smaller number of edge faces may be contemplated. In some implementations the deployable module elements may have a cross-section having a square, rectangular or circular form factor.

In the launch configuration, the deployable module elements may be disposed in a launch vehicle in a first arrangement. For example, in the configuration illustrated in Detail A, the first arrangement may be regarded as a "stacked arrangement." In the launch configuration, adjacent module elements may be mechanically coupled together. For example, module element 110(1) may be mechanically coupled with module 110(2); module element 110(2) may be mechanically coupled with module element 110(1) and with module element 110(3); module element 110(3) may be mechanically coupled with module element 110(2) and with module element 110(4); module element 110(4) may be mechanically coupled with module element 110(3) and with module element 110(5); module element 110(5) may be mechanically coupled with module element 110(4) and with module element 110(6); and module element 110(6) may be mechanically coupled with module element 110(5). Advantageously, the mechanical couplings may be releasable such that adjacent deployable modules may be separated from one another after launch. For example, the mechanical couplings may be or include releasable hold-downs or by an exoskeleton (not illustrated), as described, for example in U.S. patent application Ser. No. 15/669,470, entitled "MULTI-REFLECTOR HOLD-DOWN" and in U.S. patent application Ser. No. 15/480,276, entitled "EXOSKELETAL LAUNCH SUPPORT STRUCTURE", the disclosures of which are hereby incorporated by reference into the present application in their entireties.

In one embodiment, at least one of the deployable modules may include a robotic manipulator (not illustrated) operable to reconfigure (or "self-assemble") the spacecraft from the launch configuration to an on-orbit configuration. Detail C of FIG. 4 illustrates the spacecraft in an on-orbit configuration according to an implementation. It may be observed that, in the on-orbit configuration, the deployable modules are disposed in a second arrangement that may be regarded as a "side-by-side arrangement." In the on-orbit configuration, adjacent module elements may be mechanically coupled together. For example, module element 110(2) may be mechanically coupled with module 110(3); module element 110(3) may be mechanically coupled with module element 110(2) and with module element 110(1); module element 110(1) may be mechanically coupled with module element 110(3) and with module element 110(4); module element 110(4) may be mechanically coupled with module element 110(1) and with module element 110(5); module element 110(5) may be mechanically coupled with module element 110(4). Advantageously, the mechanical couplings may be releasable such that adjacent deployable modules may be separated from one another in order to otherwise reconfigure the spacecraft on-orbit. More details of the embodiment of FIG. 4 can be found in Unite States Patent Application Publication US 2018/0093786 "Self-Assembling Persistent Space Platform," filed on Aug. 29, 2017, incorporated herein by reference in its entirety. In one example, spacecraft 100 is a satellite.

In one embodiment, each module 110(1)-110(6) may have one or two universal external ports for connecting to an external module (as described above). In one example, modules 110(1)-110(6) connect to each other using universal external ports.

Figure 5:
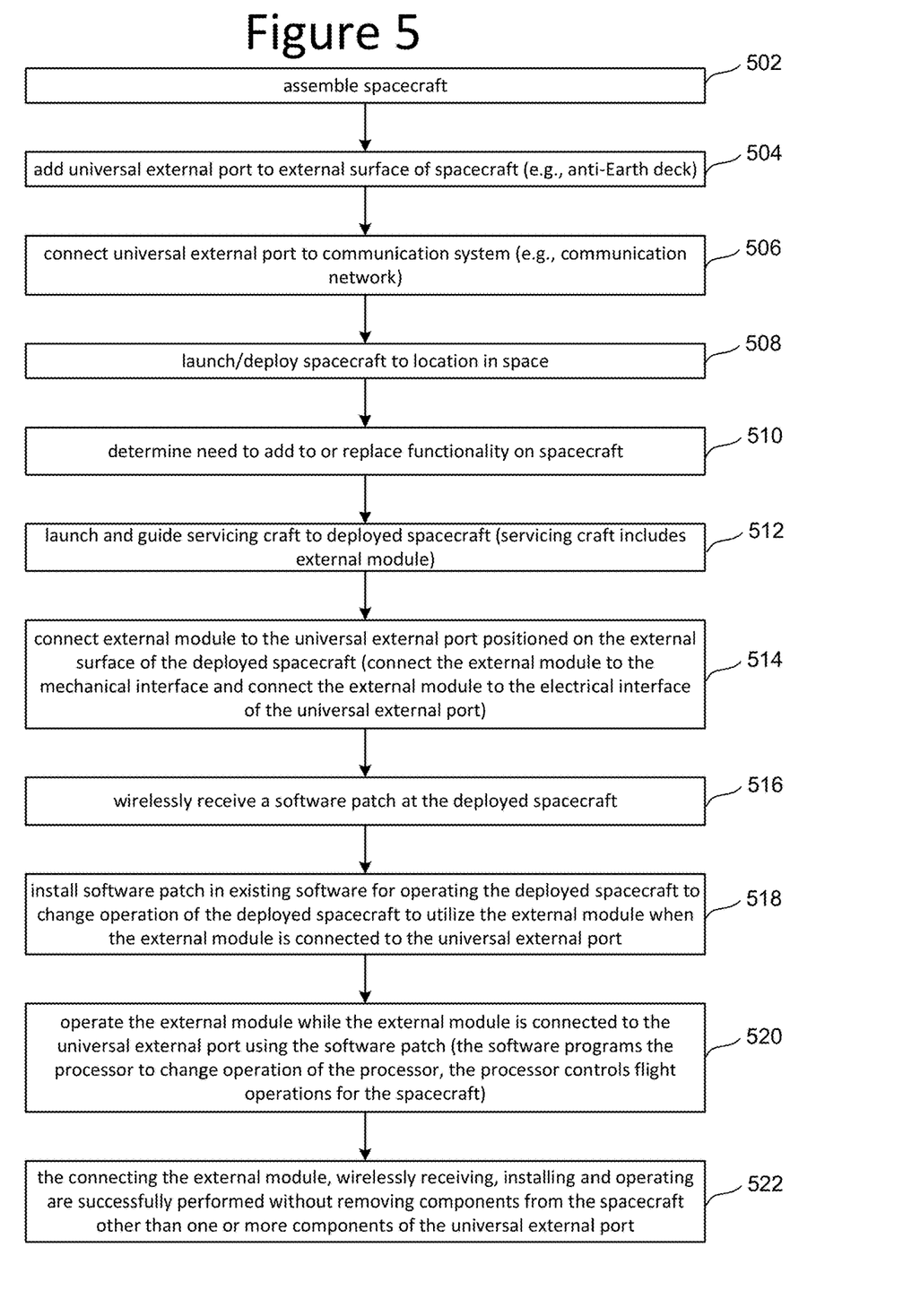
FIG. 5 is a flow chart describing one embodiment of a process for operating a spacecraft with a universal external port.

FIG. 5 is a flow chart describing one embodiment of a process for operating a spacecraft with a universal external port. The process of FIG. 5 can be used with the structures of FIGS. 1-4, as well as other spacecraft that include a universal external port. The order of performing the steps of FIG. 5 can be the order that the steps as depicted in FIG. 5, or a different order can be used as no particular order of steps is required for all embodiments.

In step 502 of FIG. 5, the spacecraft (e.g., spacecraft 10 of FIG. 1) is assembled. In step 504, one or more universal external port are added to one or more external surfaces of the spacecraft. For example, a universal external port is added to the anti-Earth deck of a satellite or other spacecraft. In step 506, the universal external port is connected to the communication system of the spacecraft. For example, universal external port 250 is connected to communication network 240. In step 508, the spacecraft launched and deployed into a location in space. Note that in some embodiments (e.g., the embodiment of FIG. 4), all or a portion of step 502 can be performed after step 508. In step 510, it is determined that there is a need to add to or replace functionality on spacecraft. For example, a component of the spacecraft may have malfunctioned, which can be detected automatically by the spacecraft or by ground control terminal 30. Alternatively, the owner or user of the spacecraft may want to add additional functionality (e.g., for a new mission or new task). In step 512, a servicing craft is launched and guided to deployed spacecraft. The servicing craft includes the external module, which will replace existing functionality or add new functionality. For example, servicing spacecraft 32 is launched and guided to spacecraft 10, with servicing spacecraft 32 transporting external module 250.

In step 514, the external module is connected to the universal external port positioned on the external surface of the deployed spacecraft (connect the external module to the mechanical interface and the electrical interface of the universal external port). For example, external module 250 is removed from servicing spacecraft 32 and connected to universal external port 224 of spacecraft 10. including connecting and locking external module 250 to mechanical interface 304, and connecting external module 250 to electrical interface 306.

In step 516, a software patch is wirelessly received at the deployed spacecraft. For example, ground control terminal 30 wirelessly (e.g., RF or optical) transmits the software patch to spacecraft 10 (e.g., via communication interface 214). This software patch will program the deployed satellite 10 to operate the newly connected external module 250. In step 518, the software patch is installed in and/or by existing software for operating the deployed spacecraft to change operation of the deployed spacecraft to utilize the external module when the external module is connected to the universal external port. For example, the software patch will program processor 210 and/or other components to operate external module 250. In step 520, the external module is operated while the external module is connected to the universal external port using the software patch. For example, the software patch programs the processor to change operation of the processor (e.g., processor 210) in order to use the external module. In some embodiments, processor 210 controls flight operations for the spacecraft.

Note that in one embodiment, the connecting the external module, wirelessly receiving, installing the software patch and operating the external module are successfully performed without removing components from the spacecraft other than one or more components of the universal external port (522).

One embodiment includes a spacecraft that comprises a processor onboard the spacecraft, a universal external port positioned on an external surface of the spacecraft and connected to the processor, and a communication interface onboard the spacecraft and connected to the processor. The universal external port is configured to connect to different types of external modules that have different functions. The universal external port comprises a mechanical interface configured to physically connect an external module to the universal external port and an electrical interface configured to provide electrical communication between the processor and the external module via the universal external port when the external module is connected to the universal external port. The communication interface is configured to wirelessly receive software (e.g., a software patch) from an entity remote from the spacecraft to program the processor to change operation of the spacecraft to utilize the external module when the external module is connected to the universal external port.

In one example implementation, the mechanical interface is configured to lock the external module to the universal external port when the spacecraft is deployed and the electrical interface is configured to provide electrical communication between the processor and the external module via the universal external port when the external module is locked to the universal external port.

One example implementation further comprises a plurality of functional modules connected to the processor. Each of the functional modules performs a different function for the spacecraft. The universal external port is configured to connect to the external module such that the external module functionally replaces functionality of one of the plurality of functional modules without removing the replaced functional module.

In one example implementation, the plurality of functional modules comprises a flight control module, propulsion module, propellant storage module, solar panel module, a charge storage module, and a sensor module.

In one example implementation, the spacecraft is a satellite; the processor, the communication interface and the universal external port are onboard the satellite; the satellite includes an anti-Earth deck; the universal external port is positioned on the anti-Earth deck; and the communication interface is configured to wirelessly receive the software from an entity remote from the satellite when the satellite is in orbit in order to program the processor to change operation of the spacecraft to utilize the external module when the external module is connected to the universal external port while the satellite is in orbit.

In one example implementation, the satellite comprises a bus and a payload; the processor, the communication interface and the universal external port are positioned on the bus; and the universal external port is configured so that different types of external modules can provide functionality to either the bus or the payload when connected to the universal external port.

In one example implementation, the universal external port is configured to provide thermal transfer between the external module and the spacecraft.

In one example implementation, the universal external port is configured to prevent thermal transfer between the external module and the spacecraft.

In one example implementation, the electrical interface include a power connection configured to deliver power to the external module.

In one example implementation, the electrical interface include a power connection configured to receive power from the external module and provide the received power to the processor.

In one example implementation, the electrical interface is a switched electrical interface.

In one example implementation, the software programs the processor to change operation of the processor, and the processor controls flight operations for the spacecraft.

One example implementation further comprises an energy source connected to the processor and the universal external port; and propellant and thrusters controller by the processor.

In one example implementation, the external module adds additional functionality to the spacecraft.

In one example implementation, the external module provides functionality that replaces functionality existing on the spacecraft without removing components from the spacecraft other than one or more components of the universal external port.

One embodiment includes a method comprising: connecting an external module to a universal external port positioned on an external surface of a deployed spacecraft, the universal external port is configured to connect to different types of external modules that have different functions, the universal external port comprises a mechanical interface and an electrical interface, the connecting the external module to the universal external port comprises connecting the external module to the mechanical interface and connecting the external module to the electrical interface; wirelessly receiving a software patch at the spacecraft to change operation of the spacecraft to utilize the external module when the external module is connected to the universal external port; and operating the external module while the external module is connected to the universal external port using the software. The connecting, wirelessly receiving and operating are successfully performed without removing components from the spacecraft other than one or more components of the universal external port.

In one example implementation, the wirelessly receiving software to the spacecraft comprises receiving software from a ground terminal; the deployed spacecraft is a satellite in orbit; the satellite includes an anti-Earth deck; and the universal external port is positioned on the anti-Earth deck.

One embodiment includes a spacecraft that comprises a plurality of functional modules and a universal external port positioned on an external surface of the spacecraft. Each of the functional modules performs a different function for the spacecraft. The universal external port is configured to connect to different types of external modules that have different functions. The universal external port comprises a mechanical interface configured to lock an external module to the universal external port when the spacecraft is deployed and a switched electrical interface configured to provide electrical communication between the processor and the external module via the universal external port when the external module is locked to the universal external port. The universal external port is configured to connect to the external module such that the external module functionally replaces one of the plurality of functional modules without removing the replaced functional module.

In one example implementation, the plurality of functional modules comprises a flight control module, propulsion module, propellant storage module, solar panel module, a charge storage module, and a sensor module.

One example implementation further comprises a communication interface. The communication interface is configured to wirelessly receive a software patch from an entity remote from the spacecraft to program the processor to change operation of the spacecraft to utilize the external module when the external module is locked to the universal external port.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. A spacecraft, comprising:
a processor onboard the spacecraft;
a universal external port positioned on an external surface of the spacecraft and configured to connect to different types of external modules that have different functions, the
universal external port comprises a mechanical interface configured to physically connect an external module to the universal external port and an electrical interface configured to provide electrical communication between the processor and the external module via the universal external port when the external module is connected to the universal external port; and
a communication interface onboard the spacecraft and connected to the processor, the communication interface is configured to wirelessly receive software from an entity remote from the spacecraft to program the processor to change operation of the spacecraft to utilize the external module when the external module is connected to the universal external port.

2. The spacecraft of claim 1, wherein:
the mechanical interface is configured to lock the external module to the universal external port when the spacecraft is deployed and the electrical interface is configured to provide electrical communication between the processor and the external module via the universal external port when the external module is locked to the universal external port.

3. The spacecraft of claim 1, further comprising:
a plurality of functional modules connected to the processor, each of the functional modules performs a different function for the spacecraft, the universal external port is configured to connect to the external module such that the external module functionally replaces functionality of one of the plurality of functional modules without removing the replaced functional module.

4. The spacecraft of claim 3, wherein:
the plurality of functional modules comprises a flight control module, communication network, propulsion module, propellant storage module, solar panel module, a charge storage module, and a sensor module.

5. The spacecraft of claim 1, wherein:
the spacecraft is a satellite;
the processor, the communication interface and the universal external port are onboard the satellite;
satellite;
the satellite includes an anti-Earth deck;
the universal external port is positioned on the anti-Earth deck; and
the communication interface is configured to wirelessly receive the software from an entity remote from the satellite when the satellite is in orbit in order to program the processor to change operation of the spacecraft to utilize the external module when the external module is connected to the universal external port while the satellite is in orbit.

6. The spacecraft of claim 5, wherein:
the satellite comprises a bus and a payload;
the processor, the communication interface and the universal external port are positioned on the bus; and
the universal external port is configured so that different types of external modules can provide functionality to either the bus or the payload when connected to the universal external port.

7. The spacecraft of claim 1, wherein:
the universal external port is configured to provide thermal transfer between the external module and the spacecraft.

8. The spacecraft of claim 1, wherein:
the universal external port is configured to prevent thermal transfer between the external module and the spacecraft.

9. The spacecraft of claim 1, wherein:
the electrical interface include a power connection configured to deliver power to the external module.

10. The spacecraft of claim 1, wherein:
the electrical interface include a power connection configured to receive power from the external module and provide the received power to the processor.

11. The spacecraft of claim 1, wherein:
the electrical interface is a switched electrical interface.

12. The spacecraft of claim 1, wherein:
the software programs the processor to change operation of the processor, the processor controls flight operations for the spacecraft.

13. The spacecraft of claim 1, further comprising:
an energy source connected to the processor and the universal external port; and
propellant and thrusters controller by the processor.

14. The spacecraft of claim 1, wherein:
the external module adds additional functionality to the spacecraft.

15. The spacecraft of claim 1, wherein:
the external module provides functionality that replaces functionality existing on the spacecraft without removing components from the spacecraft other than one or more components of the universal external port.

16. A method comprising,
connecting an external module to a universal external port positioned on an external surface of a deployed spacecraft, the universal external port is configured to connect to different types of external modules that have different functions, the universal external port comprises a mechanical interface and an electrical interface, the connecting the external module to the universal external port comprises connecting the external module to the mechanical interface and connecting the external module to the electrical interface;
wirelessly receiving a software patch at the spacecraft to change operation of the spacecraft to utilize the external module when the external module is connected to the universal external port; and
operating the external module while the external module is connected to the universal external port using the software;

the connecting, wirelessly receiving and operating are successfully performed without removing components from the spacecraft other than one or more components of the universal external port.

17. The method of claim 16, wherein:

the wirelessly receiving the software patch at the spacecraft comprises receiving the software patch from a ground terminal;

the deployed spacecraft is a satellite in orbit;

the satellite includes an anti-Earth deck; and the universal external port is positioned on the anti-Earth deck.

18. A spacecraft, comprising:

a plurality of functional modules, each of the functional modules performs a different function for the spacecraft; and a universal external port positioned on an external surface of the spacecraft and configured to connect to different types of external modules that have different functions, the universal external port comprises a mechanical interface configured to lock an external module to the universal external port when the spacecraft is deployed and a switched electrical interface configured to provide electrical communication between the processor and the external module via the universal external port when the external module is locked to the universal external port, the universal external port is configured to connect to the external module such that the external module functionally replaces one of the plurality of functional modules without removing the replaced functional module.

19. The spacecraft of claim 18, wherein:

the plurality of functional modules comprises a flight control module, communication network, propulsion module, propellant storage module, solar panel module, a charge storage module, and a sensor module.

20. The spacecraft of claim 18, further comprising:

a communication interface, the communication interface is configured to wirelessly receive a software patch from an entity remote from the spacecraft to program the processor to change operation of the spacecraft to utilize the external module when the external module is locked to the universal external port.

* * * * *

UNITED STATES PATENT AND TRADEMARK OFFICE
CERTIFICATE OF CORRECTION

| | |
|---|---|
| PATENT NO. | : 11,780,611 B2 |
| APPLICATION NO. | : 17/022550 |
| DATED | : October 10, 2023 |
| INVENTOR(S) | : R. Schwarz |

It is certified that error appears in the above-identified patent and that said Letters Patent is hereby corrected as shown below:

In the Claims

Column 11, Lines 63-64 (Claim 5, Lines 4-5) please change "satellite; satellite;" to -- satellite; --
Column 12, Line 26 (Claim 9, Line 2) please change "include a" to -- includes a --
Column 12, Line 29 (Claim 10, Line 2) please change "include a" to -- includes a --

Signed and Sealed this
Twenty-third Day of January, 2024

Katherine Kelly Vidal
*Director of the United States Patent and Trademark Office*